US012717622B2

(12) United States Patent
Dang et al.

(10) Patent No.: US 12,717,622 B2
(45) Date of Patent: Aug. 25, 2026

(54) GRAPHICS PROCESSING SYSTEMS WITH SHADOW STATE STORAGE

(71) Applicant: Arm Limited, Cambridge (GB)

(72) Inventors: Maochang Dang, Shanghai (CN); Andreas Due Engh-Halstvedt, Trondheim (NO); Andreas Danner Nilsen, Trondheim (NO); Brian Gordon Pearson, Trondelag (NO); Espen Amodt, Shanghai (CN)

(73) Assignee: Arm Limited, Cambridge (GB)

( * ) Notice: Subject to any disclaimer, the term of this patent is extended or adjusted under 35 U.S.C. 154(b) by 476 days.

(21) Appl. No.: 18/491,104

(22) Filed: Oct. 20, 2023

(65) Prior Publication Data

US 2024/0168804 A1 May 23, 2024

(30) Foreign Application Priority Data

Nov. 21, 2022 (GB) ..................................... 2217397

(51) Int. Cl.
*G06F 9/50* (2006.01)
*G06F 9/54* (2006.01)
*G06T 1/60* (2006.01)

(52) U.S. Cl.
CPC .............. *G06F 9/5005* (2013.01); *G06F 9/54* (2013.01); *G06T 1/60* (2013.01)

(58) Field of Classification Search
None
See application file for complete search history.

(56) References Cited

U.S. PATENT DOCUMENTS 6,323,860 B1 11/2001 Zhu et al.
7,817,154 B1 10/2010 Sams et al.
(Continued)

*Primary Examiner* — Eric C Wai
(74) *Attorney, Agent, or Firm* — Leveque Intellectual Property Law, P.C.

(57) ABSTRACT

The present disclosure relates to a processing resource for a graphics processing system for performing graphics processing for an application executing on a host processor of the graphics processing system according to a command stream, the command stream being generated by the host processor in response to an API call from the application, the processing resource comprising: a control circuit configured to execute commands from the command stream, wherein the command stream comprises one or more commands relating to a processing task and one or more commands relating to at least one state group associated with the processing task; at least one processing circuit configured to perform processing tasks; a shadow state storage module configured for use by the control circuit to store state information; and a processing state storage module configured for use by the processing circuit to store state information, wherein the control circuit is configured to determine one or more changed states within the at least one state group with respect to a preceding API call, to write state information comprising the one or more changed states to the shadow state storage module, and to assign the processing task to the at least one processing circuit and execute an instruction to transmit the state information from the shadow state storage module to the processing state storage module.

20 Claims, 9 Drawing Sheets

(56) References Cited

U.S. PATENT DOCUMENTS

| | | | | |
|---|---|---|---|---|
| 9,401,004 | B2 * | 7/2016 | Duluk, Jr. | G06T 1/60 |
| 10,482,567 | B2 * | 11/2019 | Lv | G06T 1/60 |
| 2014/0146062 | A1 * | 5/2014 | Kiel | G06F 11/362 345/522 |
| 2021/0374900 | A1 | 12/2021 | Kondguli et al. | |

* cited by examiner

GRAPHICS PROCESSING SYSTEMS WITH SHADOW STATE STORAGE

FIELD OF THE INVENTION

The present disclosure relates generally to graphics processing systems and, more particularly, to systems and techniques related to application programming interface (API) for graphics processing.

BACKGROUND

Data processing systems often utilize one or more data processing resources, e.g. a graphics processing unit (GPU), to perform processing tasks, such as for applications executing on a host processor, e.g. a central processing unit (CPU), of a data processing system.

The host processor causes the processing resource, e.g. graphics processor, to perform processing tasks for applications by providing to the processing resource a stream of commands (instructions) to be executed by the processing resource. For example, a driver for the processing resource may prepare a command stream containing commands (instructions) to be performed by the processing resource, and provide the command stream to the processing resource (e.g. graphics processor), with the processing resource then performing the commands (the operations indicated by the commands) in the command stream.

The command stream may, for example, contain state information, e.g. graphics states, relevant for processing tasks, as well as commands (instructions) to execute the processing tasks. The state information may be organized into a plurality of groups (e.g. state vectors) each comprising a plurality of states. Typically, when processing commands to execute a processing task, a control circuit in a processing resource builds or (re-)writes a full set of state information for entire state groups that are required by the processing task, for example at every draw call in the case of graphics processors, regardless of whether or not the state of a given state group has changed. The rewriting of state groups then triggers the rewriting/rebuilding of the entire command buffer storing instructions for the processing task and the entire resource table (e.g. shader resource table SRT) in order to update the rewritten state groups. However, building a full set of state information, command buffer and resource table for every draw call can be time-consuming as well as result in significant processing overhead from the host processor. As such, there remains scope for improving the handling of state information on a processing resource, such as a graphics processor.

SUMMARY OF THE INVENTION

In view of the foregoing, an aspect of the present technology provides a processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising: a control circuit configured to execute commands from the command stream, wherein the command stream comprises one or more commands relating to a processing task and one or more commands relating to at least one state group associated with the processing task, the at least one state group comprising a plurality of states; at least one processing circuit configured to perform processing tasks; a shadow state storage module configured for use by the control circuit to store state information; and a processing state storage module configured for use by the processing circuit to store state information, wherein the control circuit is configured to determine whether the at least one state group includes one or more changed states with respect to a preceding API call, to write state information comprising the one or more changed states of the at least one state group to the shadow state storage module, and to assign the processing task to the at least one processing circuit and execute an instruction to transmit the state information from the shadow state storage module to the processing state storage module.

In a processing resource that is arranged to perform graphics data processing for an application executing on a host processor, when the control circuit of the processing resource processes a command stream generated by the host processor in response to an application programming interface, API, call from the application, it sets the states (parameters) for a processing task based on commands in the command stream and assigns the processing task to a processing circuit amongst one or more processing circuits in the processing resource. According to embodiments of the present technology, the processing resource is provided with a shadow state storage module for use by the control circuit and a processing state storage module for use by the at least one processing circuit. The states for the processing task are organized in one or more groups, or state vectors, each group comprising a plurality of states. Based on the commands in the command stream, the control circuit determines, for a particular state group, whether the state group includes one or more changed states with respect to a preceding API call. The determination may be performed before, during, or after the commands have been executed. Herein, a preceding API call may refer to an API call immediately preceding the current API call for which the command stream being executed by the processing resource is generated, or it may refer to any API call that precedes the current API call. The control circuit then writes state information that includes the one or more changed states of the state group to the shadow state storage module. In doing so, the changed states are stored in the same known location ready for use. The control circuit then executes an instruction (e.g. a SET_STATE instruction) to transmit the state information stored on the shadow state storage module to the processing state storage module. In doing so, the state information including the one or more changed states is stored in a common and known location accessible to the processing circuit for use when it performs the assigned processing task. Compared to conventional approaches, embodiments of the present technology enable changed states to be collectively stored at the same location while the control circuit processes the commands from the host processor, such that these changed states can be made available to the assigned processing circuit with improved efficiency by sending the changed states to a storage location, the processing state storage module, that is accessible to the assigned processing circuit. The changed states stored on the processing state storage module are available for use by the processing circuit as it performs the assigned processing task, without the need to rewrite entire state group(s), command buffer and resource table, thereby conserving processing resources and time.

In some embodiments, the control circuit may be configured to clear the shadow state storage module upon execution of the instruction to transmit the state information. For example, the state information may be moved from the shadow state storage module to the processing state storage module, leaving the shadow state storage module free and available for the next processing task (or next draw call). Alternatively, the control circuit may execute an instruction to clear the content of the shadow state storage module once the instruction to transmit the state information to the processing state storage module is completed.

In some embodiments, the processing state storage module may be configured to store thereon a previous version of the at least one state group in relation to the preceding API call, and the control circuit may be configured to execute the instruction to transmit the state information from the shadow state storage module to the processing state storage module by overwriting one or more states in the previous version of the at least one state group stored on the processing state storage module corresponding to the one or more changed states with the one or more changed states. A state group may be kept on the processing state storage module available to the processing circuit until a new processing task is assigned, whereupon the control circuit sets the states of the state group for the new processing task, writes the states that have been changed to the shadow state storage module, and executes an instruction (e.g. SET_STATE) to write the changed states to the processing state storage module to update elements of the state group that correspond to the changed states.

In some embodiments, each state of the at least one state group may be provided with a state index indicating a location of the state within the at least one state group, each of the one or more changed states being identified by a corresponding state index, and the control circuit may be configured to execute the instruction to transmit the state information from the shadow state storage module to the processing state storage module based on the state index or indices of the one or more changed state. In such embodiments, the use of a unique state index for each element of a state group enables the control circuit to separately and independently call a changed state from the state group, such that, on the processing circuit side, a state within a state group that has been changed may be set independently without rewriting the entire state group.

In some embodiments, the control circuit may be configured to, when determining one or more changed state for the at least one state group, generate a predicate index for each state of the at least one state group indicating whether the state has changed. In such embodiments, the predicate index of each element of the state group can be used to identify which state(s) out of the plurality of states of the state group has been changed. The predicate index may for example be a single bit of 0 or 1 to indicate whether the state has changed.

In some embodiments, the control circuit may be configured to execute the instruction to transmit the state information from the shadow state storage module to the processing state storage module using the predicate index for each state of the at least one state group to identify the one or more changed state amongst the plurality of states in the at least one state group. Through the use of predicate indices, the control circuit is able to identify and therefore call only the changed states.

In some embodiments, the processing resource may further comprise a predicate index storage module configured to store the predicate indices for the at least one state group.

In some embodiments, the control circuit may be configured to clear the predicate index storage module upon execution of the instruction to transmit the state information.

In some embodiments, the processing resource may further comprise circuitry to enable direct memory access between the shadow state storage module and the processing state storage module.

In some embodiments, the control circuit may be configured to execute the instruction to transmit the state information from the shadow state storage module to the processing state storage module by transmitting all of the one or more changed states substantially simultaneously. In such embodiments, all states of a state group may be transmitted from the shadow state storage module to the processing state storage module through the execution of a single instruction (e.g. UPDATE_STATE_VECTOR) instead of setting one state after another in a pipeline fashion. In doing so, the speed of updating the states on the processing circuit side may be improved.

In some embodiments, the processing resource may further comprise a state handling module provided to the at least one processing circuit, the state handling module being configured to, when the at least one state group is required by the processing task assigned to the at least one processing circuit, propagate the state information stored on the processing state storage module to the processing task. In such embodiments, the state information (the updated state group) is kept on the processing state storage module, and the state handling module distributes the state information to the processing circuit when the processing task calls the state information.

In some embodiments, the state handling module may be configured to generate one or more state descriptor based on the state information stored on the processing state storage module. In such embodiments, the state handling module may additionally use the state information to generate state descriptors for one or more states (e.g. the changed states, or every state of the state group) for use by the control circuit, which may use the descriptors to generate commands.

Another aspect of the present technology provides a graphics processing system comprising: a host processor configured to execute an application by generating a command stream in response to an application programming interface, API, call from the application; and a processing resource as described above.

A further aspect of the present technology provides a method of operating a processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising: a control circuit configured to execute commands from the command stream, wherein the command stream comprises one or more commands relating to a processing task and one or more commands relating to at least one state group associated with the processing task, the at least one state group comprising a plurality of states; a shadow state storage module configured for use by the control circuit to store state information; and a processing state storage module configured for use by the processing circuit to store state information, the method comprising: determining whether the at least one state group includes one or more changed states with respect to a preceding API call; writing state information comprising the one or more changed states of the at least one state group to the shadow state storage module; assigning the processing task to the at least one processing circuit; and executing an instruction to transmit the state information from the shadow state storage module to the processing state storage module.

A yet further aspect of the present technology provides a non-transitory computer readable storage medium comprising software code which, when executed on a processor, causes the processor to perform the method as described above.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which.

DETAILED DESCRIPTION

Figure 1:
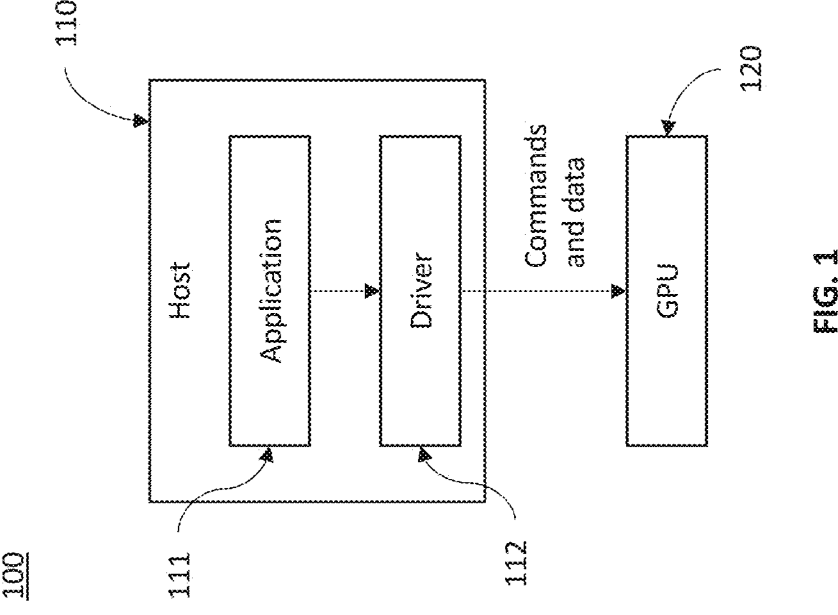
FIG. 1 shows an exemplary data processing system.

FIG. 1 shows an exemplary data processing system 100 such as a graphics processing system. The data processing system 100 includes a host processor 110, which has executing thereon an application 111, such as a game, that requires data (e.g. graphics) processing operations to be performed. The data processing system 100 thus also includes by a processing resource such as a graphics processing unit (or graphics processor) 120 configured to perform the required data processing operation for the application 111. In response to commands from the application 111 running on the host system 110 for data processing, such as to generate graphics output (e.g. to generate a frame to the displayed), a set of "commands" is provided to the processing resource 120 to instruct it to perform processing tasks. To this end, the application 111 generates API (application programming interface) calls that are interpreted by a driver 112 for the processing resource 120 running on the host processor 110 to generate appropriate commands to the processing resource 120 to perform the processing tasks, for example to generate graphics output, required by the application 111.

In present embodiments, the commands and data for performing the processing tasks required by the application 111 are provided to the processing resource 120 in the form of one or more command streams, that each include sequences of commands (instructions) to cause the processing resource 120 to perform the desired processing tasks.

The preparation of the command streams is performed by the driver 112 on the host processor 110 and the command streams may, for example, be stored in appropriate command stream buffers, from where they can then be read by the processing resource 120 for execution. Each command stream contains commands (instructions) to set parameters (states) for graphics processor tasks as well as commands (instructions) to execute a task.

Figure 2:
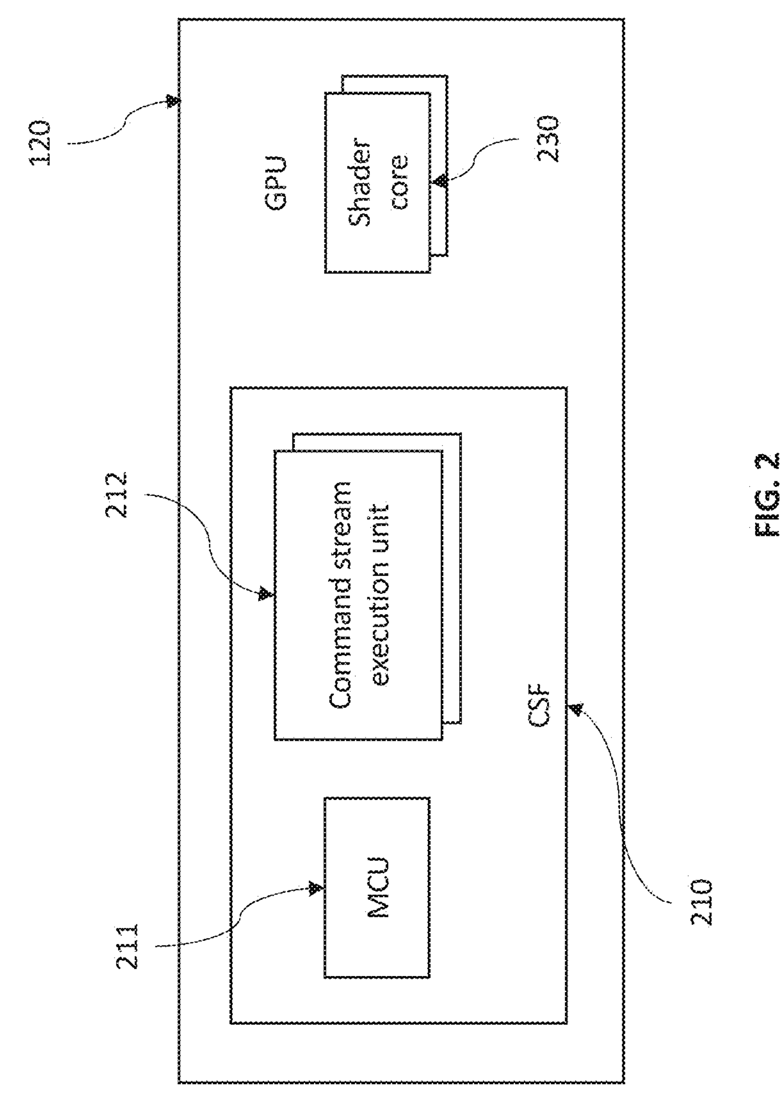
FIG. 2 shows an exemplary system overview of a data processing system according to an embodiment.

In present embodiments, as shown in FIG. 2, the processing resource 120 is provided with a command stream frontend 210 (control circuit) that includes a command stream supervisor (controller) 211 (e.g. in the form of a microcontroller) that is operable to schedule and issue commands from the command streams to respective command stream execution units 212. The command stream execution units 212 then execute the commands in the respective command streams to trigger the processing execution units 230 (processing circuit) of the graphics processor (which in the present example are shown as being a plurality of shader cores, although other arrangements are also possible) to perform the desired processing tasks.

Figure 3:
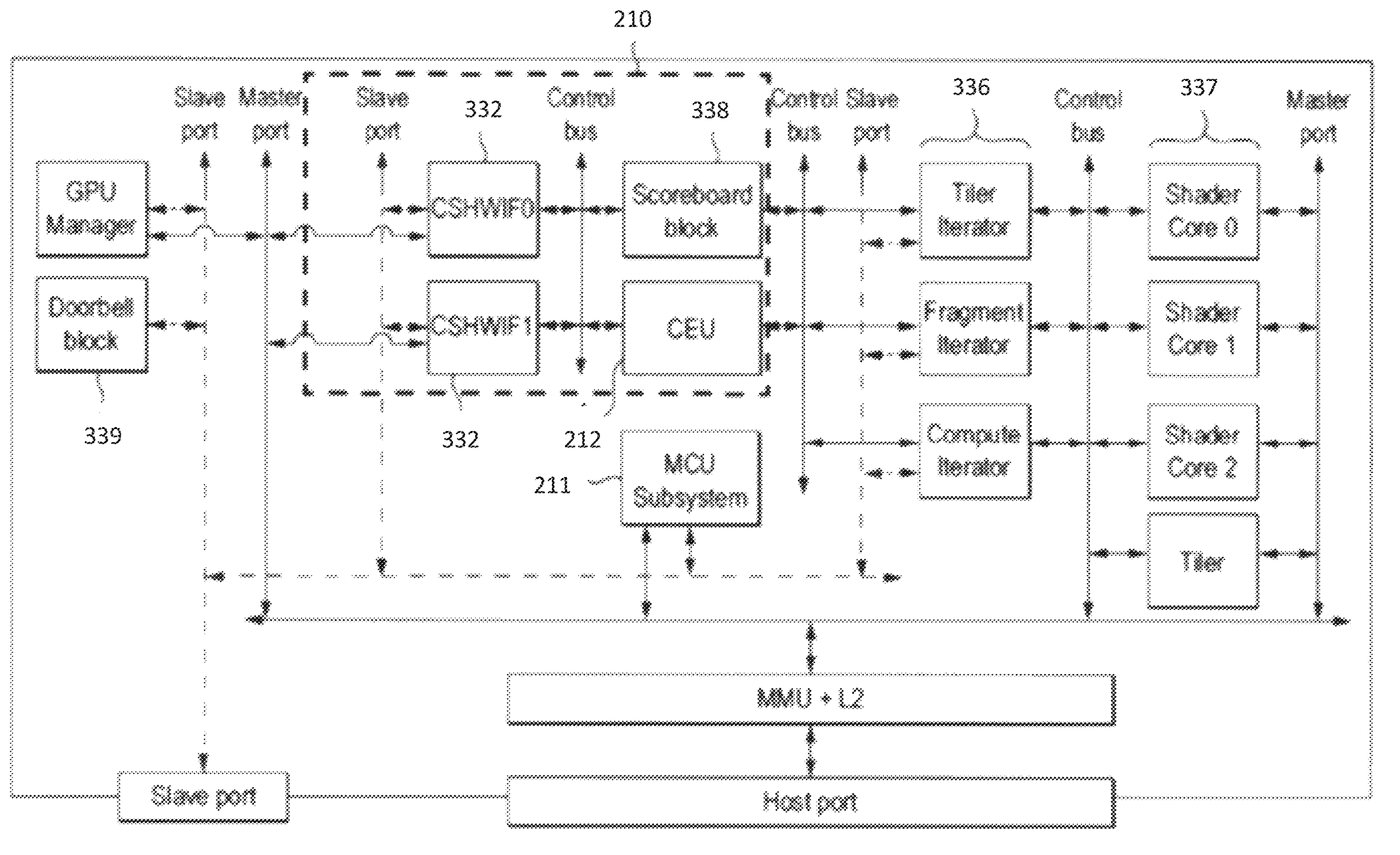
FIG. 3 shows a detailed example of a data processing system exemplified in FIG. 2.

FIG. 3 shows in more detail the graphics processor 120 including the command stream frontend 210. The supervisor (controller) 211 (in the form of a microcontroller) is configured to handle communications with the host processor 110, and schedules the processing of active command streams on the command stream frontend 210.

In present embodiments, the command stream frontend 210, which may be implemented as a single (hardware) functional unit, generally comprises one or more command stream interfaces 332 and a (shared) command stream execution unit 212. Each command stream interface 332 has an associated command buffer containing a set of active instructions to be processed, as well as a registry and local memory for storing the internal states (parameters) for the processing. The command buffers may be implemented in system memory and each command stream interface has stored thereon attributes of its associated command buffer to enable is to obtain commands from its associated command buffer.

The instructions within the command buffer(s) are provided to the command stream execution unit 212. The command stream execution unit 212 then executes the commands in turn, with the instructions either being emulated in software by the supervisor (controller) 211, or assigned to an accelerator hardware, depending, for example, on the type of instructions.

In the present embodiment, the command stream frontend 210 further comprises a scoreboard block 338 that is able to independently track the processing job completion for each of the command stream interfaces 332; the scoreboard block 338 is thus a shared resource. The scoreboard block 338 then reports the progress of the processing tasks associated with each processing job back to the supervisor (controller) 211.

As shown in FIG. 3, the processing resource 120 includes a number of hardware units, such as a plurality of iterators 336 (separate tiler, fragment and compute iterators are provided herein, although other arrangements are also possible) and processing (e.g. shader) cores 337. A processing job specified in a command being executed by the command stream execution unit 212 is assigned and sent to a respective iterator 336, along with the current parameters (states) held within the registry and local memory. The iterator 336 acts to break down the specified processing job into a set of processing tasks which can then be distributed amongst the processing cores 337 for processing.

In the present embodiment, the host processor 110 communicates with the supervisor (controller) 211 of the graphics processor 120 via a shared interface memory (which may be main memory or another suitable memory cache, depending on configuration). When an application 111 running on the host processor 110 makes a call for processing by the processing resource 120, the host processor 110 communicates with the supervisor (controller) 211 of the processing resource 120 via the shared memory, and the supervisor (controller) 211 reads the data in from the shared memory. For instance, the host processor 110 may write to a doorbell block 339 to interrupt the current operation of the supervisor (controller) 211 and cause the supervisor (controller) 211 to handle new work.

Once the supervisor (controller) 211 receives a request from the host processor 110 to execute a command stream, the supervisor (controller) 211 assigns the command stream to a respective command stream interface 332, and the command stream is loaded into an associated command buffer for the assigned interface (and the command stream properties written to the assigned interface). The commands are then passed in order from the command buffer to the command stream execution unit 212 which interprets the commands from the command buffers, and executes the commands using the local memory and registry information associated with that command stream interface and buffer.

When a command is executed by the command stream execution unit 212, depending on the type of instruction, the instruction may be performed either in hardware (e.g. by the command stream execution unit 212 itself, or using the iterators 336 and shader core 337), or may be emulated by the supervisor (controller) 211. For instance, commands e.g. for updating the local memory and registry information may typically be implemented by the command stream execution unit 212 in order to set the states (parameters) for a processing job. The processing job may then be sent to the hardware unit(s) for processing, along with these states (parameters).

Figure 4:
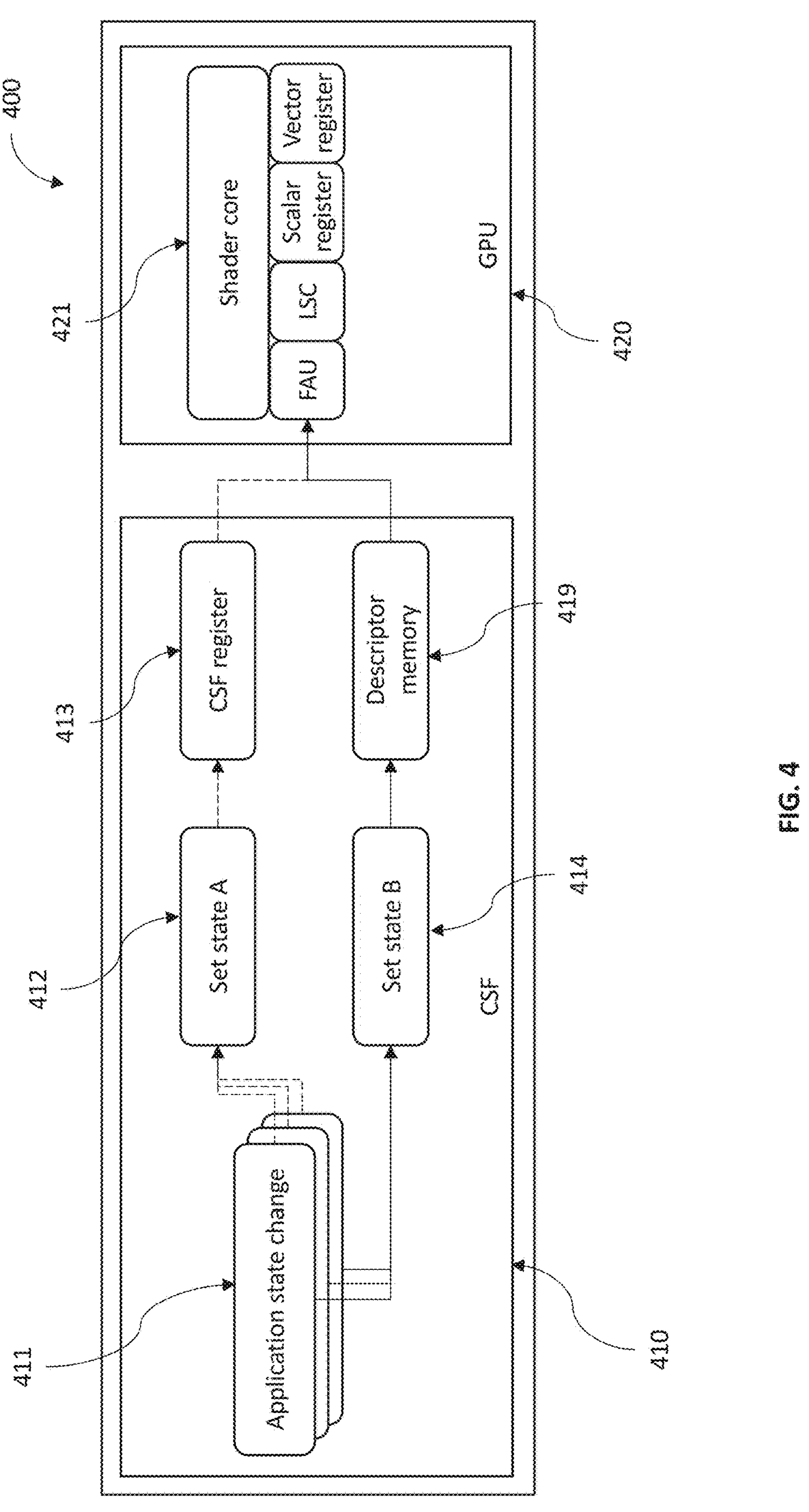
FIG. 4 shows schematically an exemplary implementation of state updating.

FIG. 4 shows schematically a conventional approach to state updating in a processing resource 400. The processing resource 400 comprises a command stream frontend CSF 410 (control circuit) which communicates with a host processor and a hardware unit 420 (processing circuit) for performing processing tasks. When an application executing on the host processor generates an API call, a driver for the processing resource 400 running on the host processor generates appropriate commands to the processing resource 400 to perform processing tasks required by the application. Upon receiving the commands from the driver, the commands are executed by the CSF 410. Execution of the application causes some state (parameter) changes that are required by the processing resource when performing data processing. Thus, the commands received and executed by the CSF 410 may include setting/updating the states for the processing tasks in a system memory. State changes 411 are processed by the CSF 410.

In one approach, shown by the solid-line data flow, a state change 414 requires a descriptor to be built 419 and triggers a rewrite of entire command buffer and resource table, sometimes an entire pipeline is rebuilt. When the assigned hardware unit, e.g. shader core 421, executes the processing task, the shader core 421 loads the descriptors and resource table data from the system memory to a local memory. This process can be resource intensive and time consuming.

In another approach, shown by the dashed-line data flow, a state change 412 updates a mapping CSF register 413 and pushes the state change into one or more fast access memory (fast RAM) on the hardware unit 420, e.g. FAU and LSC, directly through hardware support (not shown). However, CSF register 413 and FAU are size limited and therefore this approach may not be suitable in some cases, while increasing the size of the CSF register and e.g. FAU would incur a significant cost to power performance area (PPA).

Figure 5:
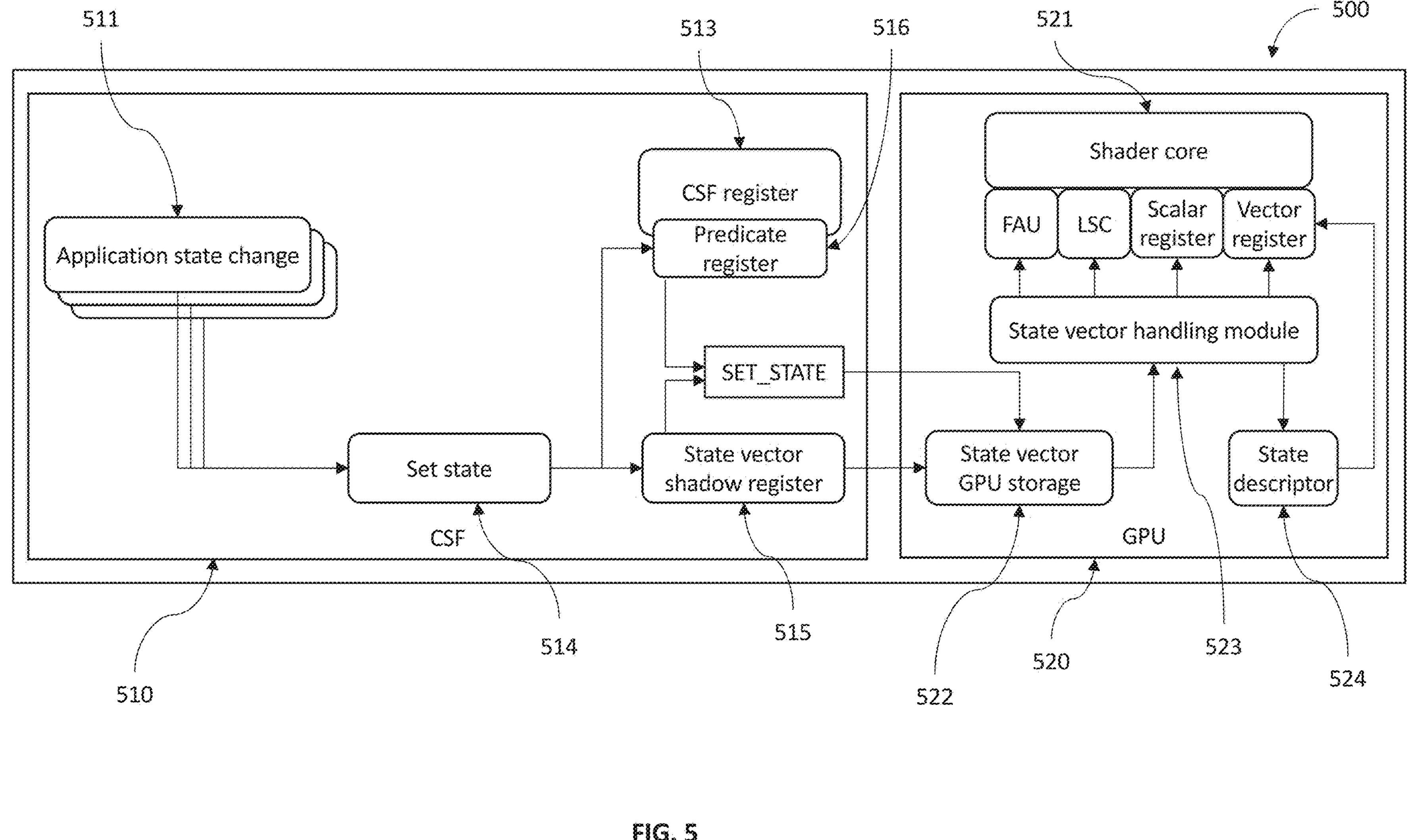
FIG. 5 shows schematically an implementation of state updating according to an embodiment.

FIG. 5 shows an exemplary implementation of state updating in a processing resource according to an embodiment, as illustrated by the solid-line data flow. A processing resource (e.g. GPU) 500 again comprises a command stream frontend CSF 510 (control circuit) which communicates with a host processor and a hardware unit 520 (processing circuit) comprising a shader core 521 for performing processing tasks. State changes 511 caused by execution of an application on the host processor are processed by the CSF 510.

Moreover, in the present embodiment, the processing resource is provided with additional software and hardware modules. The CSF 510 is provided with a state vector shadow register (state shadow storage module) 515 and a predicate register 516, and the hardware unit 520 is provided with a state vector GPU storage (processing state storage module) 522, a state vector handling module 523 and a state descriptor generator 524. Provision of the predicate register 516, the state vector handling module 523 and state descriptor generator 524 is entirely optional, as will be apparent from the discussion below.

In the present embodiment, the state vector shadow register 515 is implemented as a register group on the CSF 510 configured with sufficient capacity to accommodate a single state. For example, viewport requires 4×32 bit registers, which are populated when viewport is updated. The state vector shadow register 515 is populated at the start of a state change process (e.g. at each draw call) and cleared before a subsequent state change (e.g. at the end of each draw call). The state vector predicate register 516 is implemented on the CSF register 513 and configured to store a plurality of predicate bits each associated with each state in a state vector (group). Each predicate bit indicates whether the associated state is to be changed or not (e.g. 0 indicates no change and 1 indicates it is to be changed), and the position of each predicate bit indicates a position in the state vector that uniquely identifies a state amongst the plurality of states in the state vector. Based on the data stored on the predicate register 516, the CSF 510 can perform a vector predicate operation to determine for each state of the state vector whether the state is to be changed or updated to enable state updating to be performed individually without the need to update the entire state vector. Moreover, based on the predicate data stored on the predicate register 516, subsequent operations such as rendering and resource manipulation that specify states that, according to the predicate data, are indicated as not changed may be omitted to conserve processing resources. The state vector predicate register 516 is populated at the start of the state change/updating process (e.g. at the start of a draw call) and cleared before a subsequent state change/updating process (e.g. at the end of the draw call or after RUN_IDVS when the state information on the state vector shadow register 515 has been transmitted).

On the hardware unit (e.g. shader core) 520 side, the state vector GPU storage 522 is implemented as a quick access memory space for exclusive use by the hardware unit 520. For example, the state vector GPU storage 522 may be implemented in a tiler heap. The state vector GPU storage 522 is written or updated directly through execution of an instruction by the CSF 510 (e.g. SET_STATE, SET_MULTIPLE, etc.) e.g. using state-filtering predicate bits stored on the predicate register 516. Optionally, unchanged states may be shared across a RUN command. When the updating of the state vector GPU storage 522 is complete, during run time of the processing task assigned to the hardware unit 520, the state vector handing module 523 distributes or propagates the states stored on the state vector GPU storage 522 to appropriate places for use by the shader core 521. For example, for the shader core 521, such appropriate places may be FAU, LSC, one or more scalar registers, and one or more vector registers, and for a fragment shader, such appropriate places may be a tiler transport DCD and a polygon list. The state vector handing module 523 may also be configured to generate state descriptors using the state information stored on the state vector GPU storage 522 for use by the shader core 521. The state descriptors may also be used by the hardware unit (GPU) 520 to generate commands. The state vector GPU storage 522 may be implemented through fast on-chip memory (e.g. SRAM) to enable fast state propagation, though slower access memory (e.g. DRAM) may be used alternatively with lower efficiency if insufficient SRAM is available.

Once the state vector shadow register 515 and the state vector predicate register 516 are populated, the CSF 510 executes a SET_STATE instruction to directly set specified states to the state vector GPU storage 522 (e.g. from CSF to the tiler if the state vector GPU storage 522 is implemented on a tiler). The SET_STATE instruction uses the predicate data on the state vector predicate register 516 to identify states in the state vector that requires updating, and fetches the changed states from the state information stored on the state vector shadow register 515, then set the changed states to the state vector GPU storage 522. Since changed states can be uniquely identified from the plurality of states of a state vector (group) through the use of predicate bits, it is possible to perform the SET_STATE instruction on only the changed states without the need to rewrite the entire state vector. Since the SET_STATE instruction uses predicate data stored on the state vector predicate register 516 as input, which can use multiple valid bits to identify multiple changed states amongst all the states of a state vector, it is possible to perform all required state changes on the state vector GPU storage 522 through execution of a single instruction (executing the SET_STATE instruction once only). Thus, SET_STATE_MULTIPLE can be implicitly implemented.

In an implementation example according to the present embodiment, an application executing on a host processor generates a graphic state change API call that is interpreted by a driver for a GPU (such as processing resource 500) running on the host processor to generate appropriate commands. According to the present embodiment, instead of rebuilding a command buffer and resource table (e.g. SRTE, SRT, Uniform) to write one or more state changes into the command buffer and resource table, the driver populates the states (or state vector/group) specified in the graphic state change API call in the state vector shadow register 515, and updates the state vector predicate register 516 to identify one or more changed states in a state vector.

Once the updating of the state vector shadow register 515 and the state vector predicate register 516 is complete, a SET_STATE instruction is encoded and called by the CSF 510, which executes the instruction to transmit/transport the state information stored on the state vector shadow register 515 to the state vector GPU storage 522 based on the predicate data on the state vector predicate register 516.

During a command building stage in which the CSF 510 builds a command stream in a command buffer to be executed by the hardware unit 520, a series of SET_STATE commands is generated in the command stream. When the hardware unit 520 executes the command stream, the state vector GPU storage 522 is populated by the changed states as the SET_STATES commands are executed. At this point, state descriptors 524 for the changed states may also be generated by the state vector handling module 523. Then, when commands from the command buffer are executed during run time, these changed states are propagated to hardware modules that require them for shader core execution. Optionally, the state vector GPU storage 522 may be configured such that state information stored thereon is shared across secondary command buffers or bundles associated with the same primary command buffer, and one or more unchanged states may be inherited by subsequent secondary command buffers.

Figure 6:
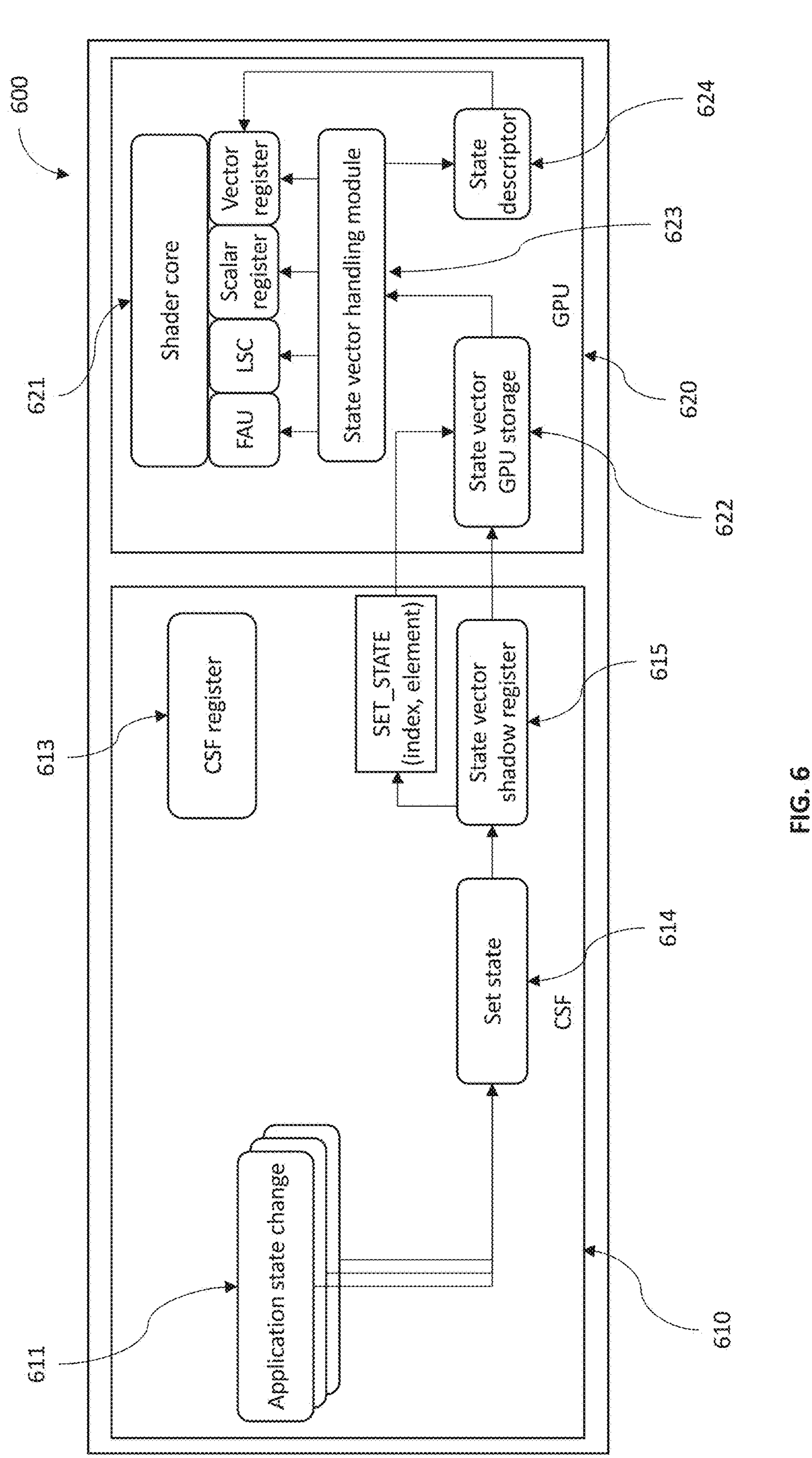
FIG. 6 shows schematically an implementation of state updating according to another embodiment.

FIG. 6 shows an exemplary implementation of state updating in a processing resource 600 according to another embodiment, as illustrated by the solid-line data flow. In the present embodiment, the state vector predicate register 516 is omitted from the processing resource 600; instead, each element (state) of a state vector is identified in the state vector by a unique element ID (index).

Figures 9, 10:
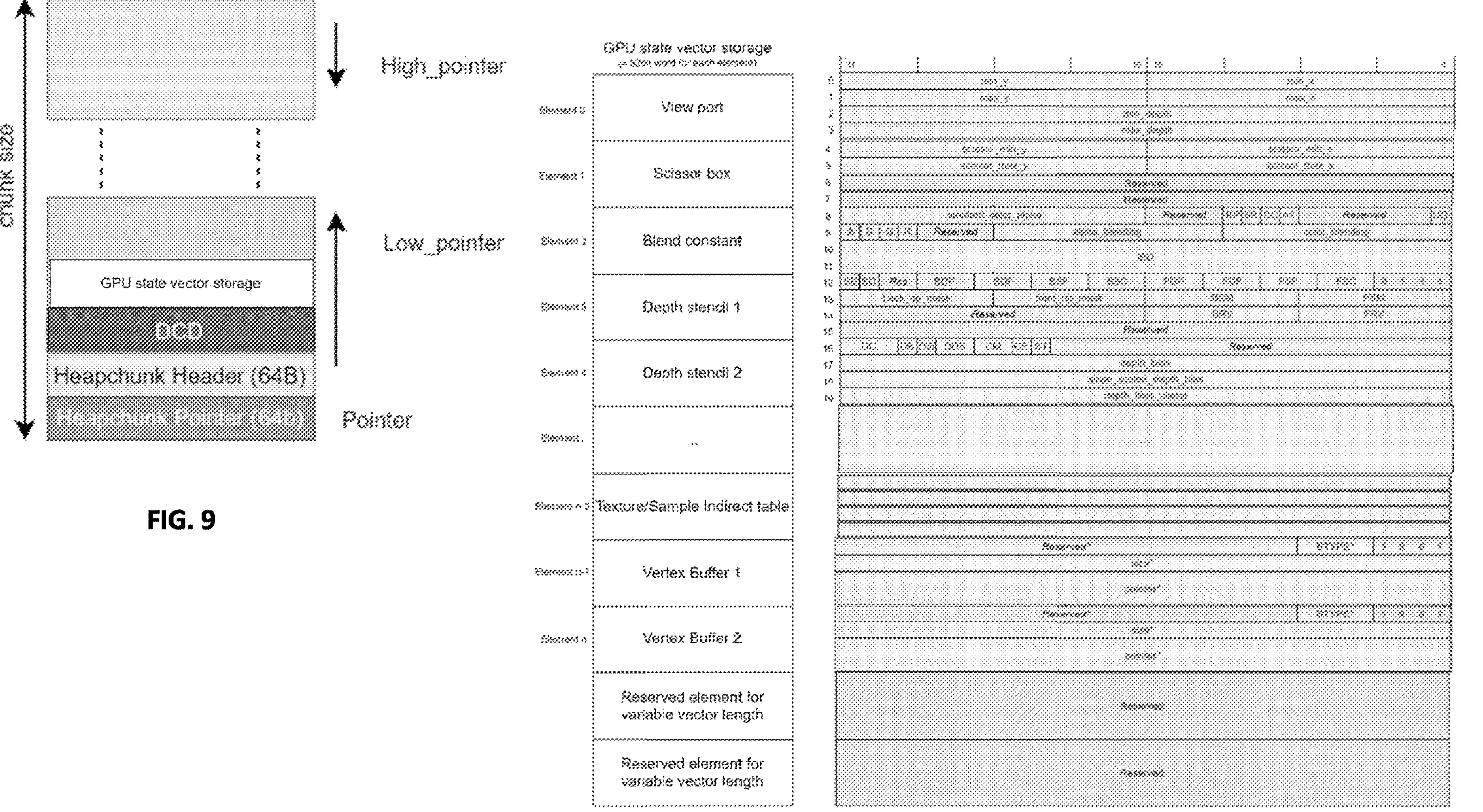
FIG. 9 shows an exemplary state vector GPU storage implementing on a tiler heap.
FIG. 10 shows an exemplary layout of an exemplary GPU graphic state vector.

An example of such a state vector is shown in FIG. 10. FIG. 10 shows a detailed layout of an exemplary GPU graphic state vector stored e.g. on a state vector shadow register 615 or on a state vector GPU storage 622. For example, a state vector GPU storage implementing on a tiler heap is shown in FIG. 9. In the present example, it may be arranged such that each state vector element occupies a predetermined fixed size of e.g. a 4×32-bit length. Each element/state is then identified by an element or state index (e.g. element 0, 1, 2, . . . , n−1, n). Where an element is larger than 4×32 bits, it can be divided into two or more elements, as shown by Depth stencil in FIG. 10, which has 8×32 bits and is divided into two elements, Depth stencil 1 and Depth stencil 2, each of 4×32 bits.

The present embodiment may be regarded as simpler compared to the previous embodiment, in that a predicate register (and predicate data) is not required. The SET_STATE instruction is also simplified, in that does not require predicate bits as input to identify changed states. In particular, a driver for the processing resource 600 transforms state information into the state element format according to the present embodiment, e.g. to format each state of a state vector to a predetermined fixed length (e.g. 4×32-bit). After transformation of the state elements in the state vector, changed state element is written to the state vector shadow register 615. Then, execution of the SET_STATE instruction simply uses a state index and state information on the state vector shadow register 615, or even using a state index alone since the state index uniquely identifies a state element on the state vector shadow register 615, as input to update the state information on the state vector GPC storage 622 (e.g. SET_STATE<index, element> or SET_STATE<index>). In embodiments where multiple changed states are stored on the state vector GPC storage 622 that need to be transported to the state vector GPU storage 622, the SET_STATE instruction may be called for each changed state, or a SET_STATE_MULTIPLE instruction may be called using an index array as the input for a series of continuous state elements.

Figure 7:
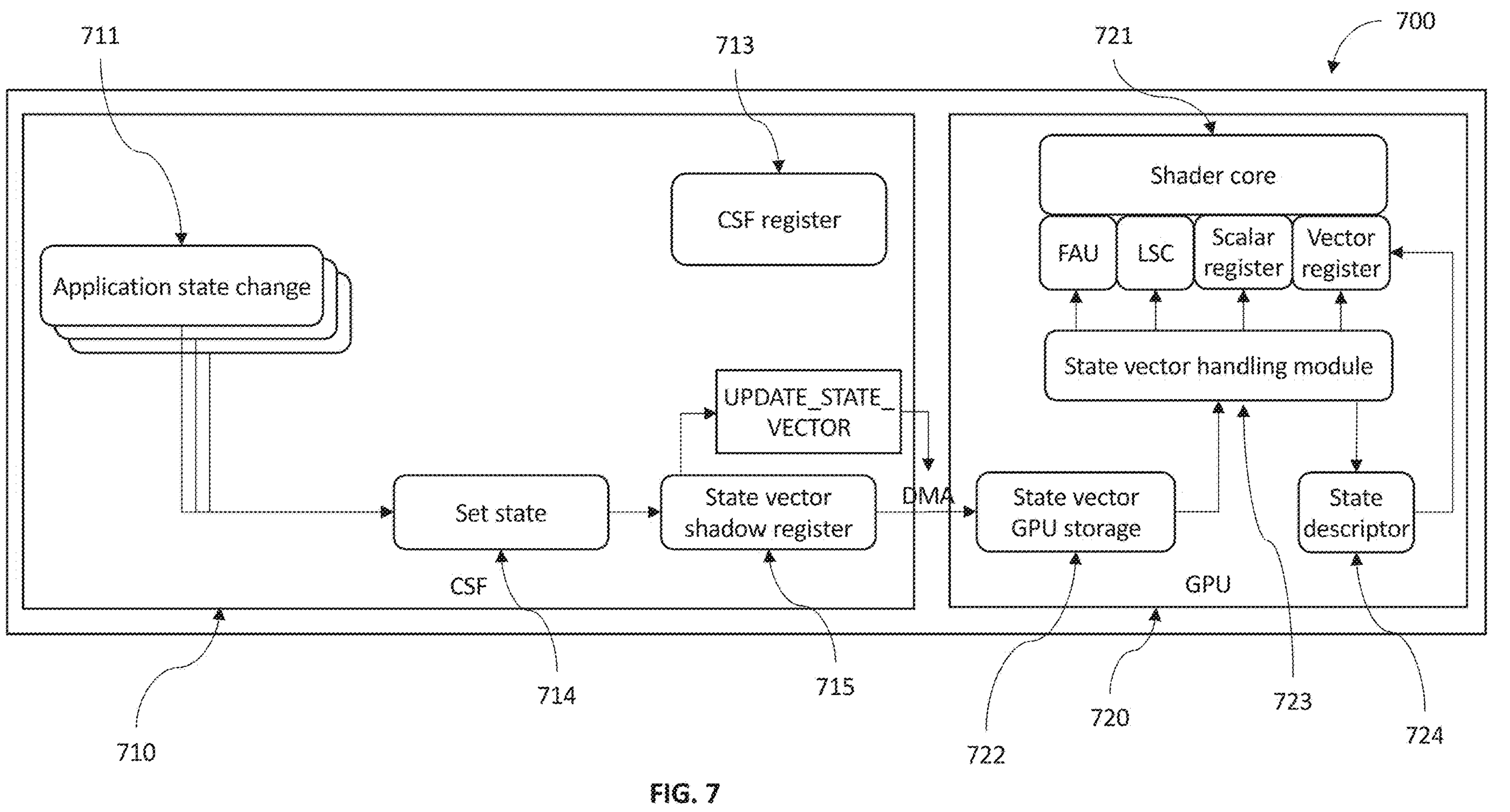
FIG. 7 shows schematically an implementation of state updating according to a further embodiment.

FIG. 7 shows an exemplary implementation of state updating in a processing resource 700 according to a further embodiment, as illustrated by the solid-line data flow. In the present embodiment, the state vector predicate register 516 is again omitted from the processing resource 700.

In the present embodiment, the processing resource 700 is configured to enable direct memory access (DMA) between a state vector shadow register 715 and a state vector GPU storage 722. According to the present embodiment, all states of a state vector (changed states and unchanged states) are written to the state vector shadow register 715, then CSF 710 executes a different instruction UPDATE_STATE_VECTOR to transmit/transport all states of the state vector accumulated in the state vector shadow register 715 in a single step through DMA.

The present embodiment is simpler still compared to the previous embodiment, in that all states of a state vector are updated in a single step through execution of a single instruction. The present embodiment updates all states of a state vector in the state vector GPU storage 722 indiscriminately irrespective of whether a state is changed or not; however, during a state propagation stage, a state vector handling module 723 may still be configured to propagate changed states only. In order to accommodate a larger volume of state information to be stored, the state vector shadow register 715 may be emulated as a fixed address memory block, for example.

Figure 8:
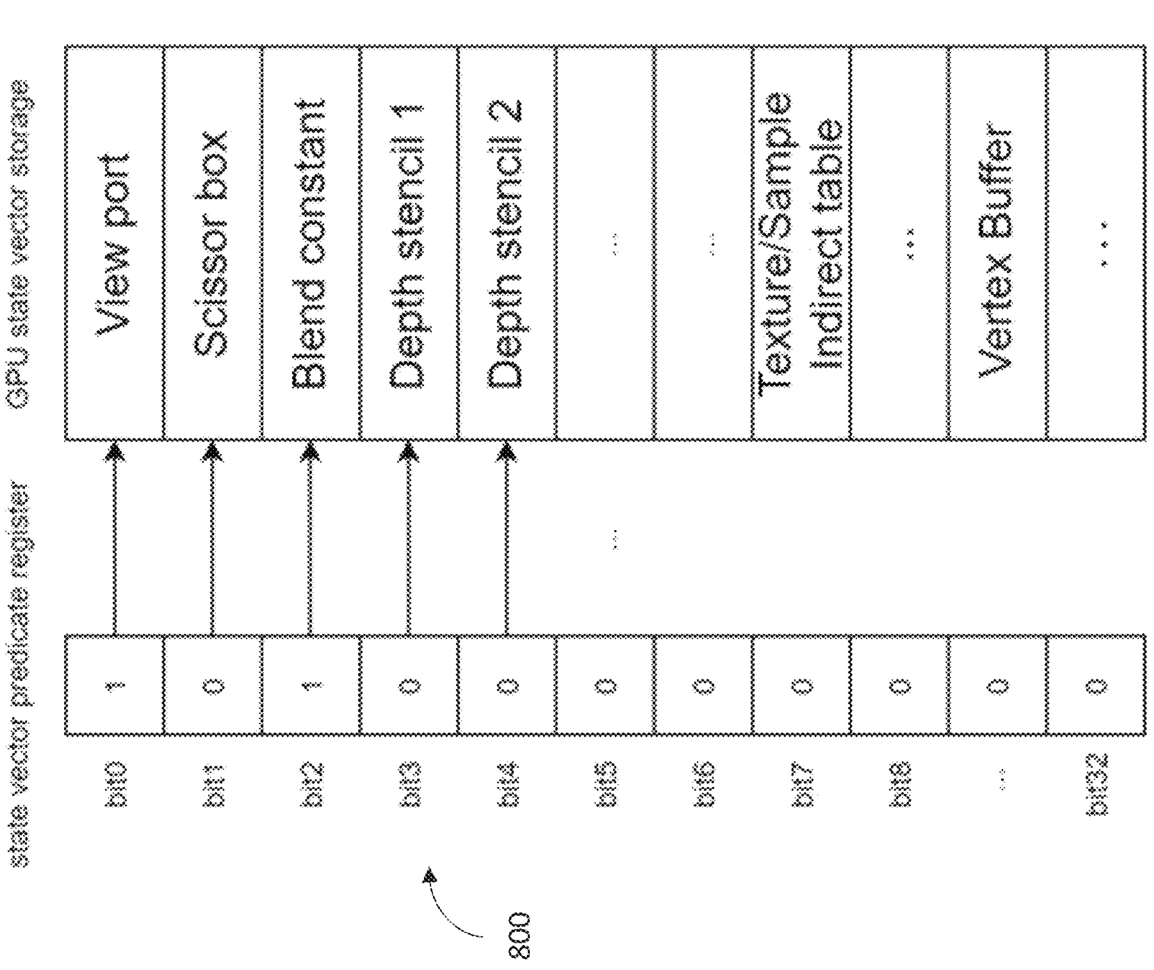
FIG. 8 shows schematically an exemplary implementation of a predicate register.

As described above with reference to FIG. 5, a state vector predicate register may be provided to a processing resource to assist with state vector operations (e.g. load, store, SET_STATE, STATE_QUERY, etc.), and used for manipulating multiple states in a single instruction. FIG. 8 shows an exemplary state vector predicate register 800 according to an embodiment. The state vector predicate register 800 is a 32-bit register, wherein each bit indicates whether an associated state in a state vector should be operated on when a state vector operation instruction is executed, e.g. SET_STATE or QUERY_STATE. More specifically, each bit of the predicate register 800 can be arranged to indicate whether an associated state requires updating (has been changed), for example a "1" indicates the associated state has been changed while a "0" indicates the associated state remains the same as before.

The state vector predicate register 800 may be implemented as hardware (one or more registers) or emulated as software (e.g. bitmask word), based on a state update pattern analysis. If the state update pattern analysis determines that state updating is dominated by multiple state operations (state operations performed in groups) and that such multiple state operations are likely to incur high overhead as a software implementation, then hardware implementation is considered. On the other hand, hardware support may not be necessary if state updating is dominated instead by state operations performed individually (single state update), then a unique index or an index array may be used to identify the relevant state(s) and a hardware implementation of a state vector predicate register is not necessary. However, in embodiments where sparse state elements are updated (state indices of state elements to be updated are not continuous), then a hardware implementation of a state vector predicate register may be useful.

In an embodiment, state vector predicate operations based on the use of a state vector predicate register include SET_STATE, SET_STATE_MULTIPLE, QUERY_STATE, SV_PROPAGATION, SV_LOAD, SV_STORE, etc., and the use of a state vector predicate register can support:

per-state predication: when operations are performed on individual states in a single instruction, an individual state may be identified using predicate data stored on a predicate register;

multiple-state predication: when operations are performed on multiple-states in a single instruction, each of the multiple states may be individually identified using predicate data stored on a predicate register;

predicate equal operation: predicate data may also be used to determine if there are any state changes between a previous draw call and a subsequent draw call, such that it is possible to identify states that have not been changed between draw calls, and operations to update a state or to perform a resource manipulation command for a specified state may be skipped or omitted if the state specified in an operation is identified as not changed, thus conserving processing resources and time.

In some embodiments, a state vector GPU storage (e.g. 522, 622, 722) may be configured to allow state information stored thereon to be recorded and shared amongst secondary buffers (e.g. Vulkan) or bundles (e.g. DX) that are associated with the same primary command buffer. This enable an implementation of state inheritance that can lead to performance improvement in some API (e.g. Vulcan, DX). An example of such an implementation is illustrated in FIG. 11.

In conventional approaches, graphic states that are specified in a shader resource table must be set for each secondary command buffer separately, as states are not recorded in a known location such that it cannot be determined whether (and which) a graphic state can be inherited across secondary buffers. It is therefore either not possible or is computational expensive to implement graphic state inheritance.

Figure 11:
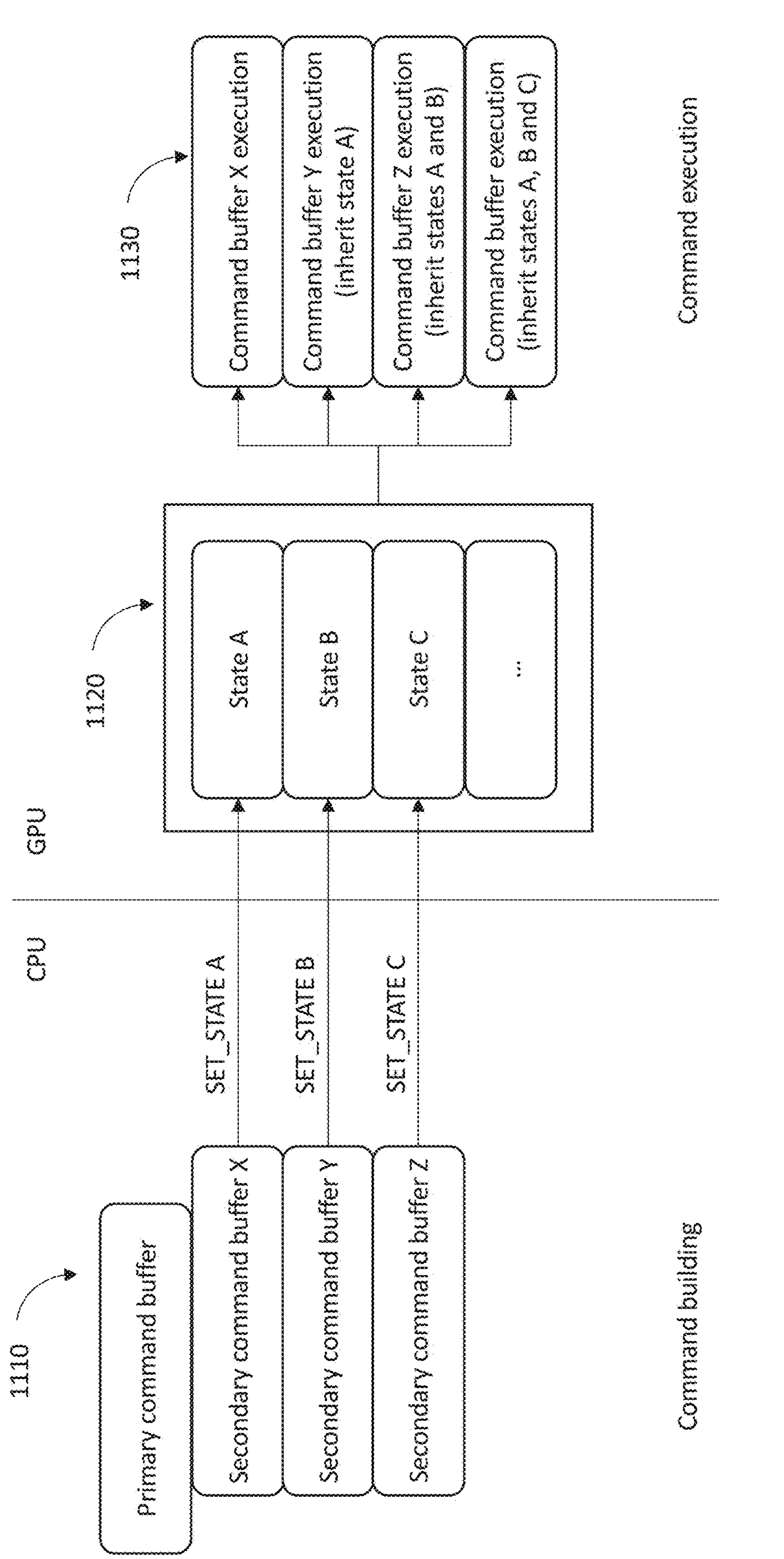
FIG. 11 shows an exemplary implementation of state inheritance.

In the present embodiment of FIG. 11, as a host processor (CPU) builds command buffers 1110, instructions (SET_STATE A, SET_STATE B, SET_STATE C) are executed to set the changed states, State A, State B, State C, to the processing resource (GPU) using one of the methods described above. The changed states State A, State B, State C are stored on a hardware-implemented state vector GPU storage 1120 that has been configured for sharing amongst secondary buffers and bundles. As a hardware unit on the processing resource (e.g. a shader core) executes the command on the command buffers 1110, as each secondary command buffer (command buffers X, Y and Z) is called by the primary command buffer and executed, a changed state called by that command buffer is inherited by a subsequent secondary buffer, and when all secondary command buffers have been executed and operation returns to the primary command buffer, the primary command buffer then inherit all the changed states that have been called by the secondary buffers. Since the changed states are stored and recorded on a known location (the state vector GPU storage 1120), it is possible for this state information to be shared amongst buffers and bundles without the need to separate set each state for each secondary buffers—a state can simply be fetched from the state vector GPU storage 1120.

Techniques describe herein enable states in a state group to be updated separately and independently of each other on a processing resource through implementation of a shadow state storage module for a control circuit of the processing resource and a state storage module for a processing circuit of the processing resource. As such, techniques described herein enable an improvement in processing resource performance and reduce latency on data processing by the processing resource. It is also possible to reduce power consumption as a result of an improvement in processing efficiency, which is of particular importance when the processing resource is implemented in portable or wearable devices.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

Some aspects and features of the disclosed embodiments are set out in the following numbered items:

1. A processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising:

a control circuit configured to execute commands from the command stream, wherein the command stream comprises one or more commands relating to a processing task and one or more commands relating to at least one state group associated with the processing task, the at least one state group comprising a plurality of states;

at least one processing circuit configured to perform processing tasks;

a shadow state storage module configured for use by the control circuit to store state information; and a processing state storage module configured for use by the processing circuit to store state information, wherein the control circuit is configured to determine whether the at least one state group includes one or more changed states with respect to a preceding API call, to write state information comprising the one or more changed states of the at least one state group to the shadow state storage module, and to assign the processing task to the at least one processing circuit and execute an instruction to transmit the state information from the shadow state storage module to the processing state storage module.

2. The processing resource of item 1, wherein the control circuit is configured to clear the shadow state storage module upon execution of the instruction to transmit the state information.

3. The processing resource of item 1 or 2, wherein the processing state storage module is configured to store thereon a previous version of the at least one state group in relation to the preceding API call, and the control circuit is configured to execute the instruction to transmit the state information from the shadow state storage module to the processing state storage module by overwriting one or more states in the previous version of the at least one state group stored on the processing state storage module corresponding to the one or more changed states with the one or more changed states.

4. The processing resource of any preceding item, wherein each state of the at least one state group is provided with a state index indicating a location of the state within the at least one state group, each of the one or more changed states being identified by a corresponding state index, and the control circuit is configured to execute the instruction to transmit the state information from the shadow state storage module to the processing state storage module based on the state index or indices of the one or more changed state.

5. The processing resource of any preceding item, wherein the control circuit is configured to, when determining one or more changed state for the at least one state group, generate a predicate index for each state of the at least one state group indicating whether the state has changed.

6. The processing resource of item 5, wherein the control circuit is configured to execute the instruction to transmit the state information from the shadow state storage module to the processing state storage module using the predicate index for each state of the at least one state group to identify the one or more changed state amongst the plurality of states in the at least one state group.

7. The processing resource of item 5 or 6, further comprising a predicate index storage module configured to store the predicate indices for the at least one state group.

8. The processing resource of item 7, wherein the control circuit is configured to clear the predicate index storage module upon execution of the instruction to transmit the state information.

9. The processing resource of any preceding item, further comprising circuitry to enable direct memory access between the shadow state storage module and the processing state storage module.

10. The processing resource of item 9, wherein the control circuit is configured to execute the instruction to transmit the state information from the shadow state storage module to the processing state storage module by transmitting all of the one or more changed states substantially simultaneously.

11. The processing resource of any preceding item, further comprising a state handling module provided to the at least one processing circuit, the state handling module being configured to, when the at least one state group is required by the processing task assigned to the at least one processing circuit, propagate the state information stored on the processing state storage module to the processing task.

12. The processing resource of item 11, wherein the state handling module is configured to generate one or more state descriptor based on the state information stored on the processing state storage module.

13. A graphics processing system comprising:

a host processor configured to execute an application by generating a command stream in response to an application programming interface, API, call from the application; and a processing resource of any of items 1-10.

14. A method of operating a processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising:

a control circuit configured to execute commands from the command stream, wherein the command stream comprises one or more commands relating to a processing task and one or more commands relating to at least one state group associated with the processing task, the at least one state group comprising a plurality of states;

at least one processing circuit configured to perform processing tasks;

a shadow state storage module configured for use by the control circuit to store state information; and a processing state storage module configured for use by the processing circuit to store state information, the method comprising:

determining, whether the at least one state group includes one or more changed states with respect to a preceding API call;

writing state information comprising the one or more changed states of the at least one state group to the shadow state storage module;

assigning the processing task to the at least one processing circuit; and executing an instruction to transmit the state information from the shadow state storage module to the processing state storage module.

15. The method of item 14, further comprising clearing the shadow state storage module upon execution of the instruction to transmit the state information.

16. The method of item 14 or 15, wherein the processing state storage module has stored thereon a previous version of the at least one state group in relation to the preceding API call, and wherein executing the instruction to transmit the state information from the shadow state storage module to the processing state storage module comprises overwriting one or more states in the previous version of the at least one state group stored on the processing state storage module corresponding to the one or more changed states with the one or more changed states.

17. The method of any of items 14 to 16, wherein each state of the at least one state group is provided with a state index indicating a location of the state within the at least one state group, each of the one or more changed states being identified by a corresponding state index, and executing the instruction to transmit the state information from the shadow state storage module to the processing state storage module is performed based on the state index or indices for the one or more changed state.

18. The method of any of items 14 to 17, further comprising, when determining one or more changed state for the at least one state group, generating a predicate index for each state of the at least one state group indicating whether the state has changed.

19. The method of item 18, wherein executing the instruction to transmit the state information from the shadow state storage module to the processing state storage module is performed using the predicate index for each state of the at least one state group to identify the one or more changed state amongst the plurality of states in the at least one state group.

20. The method of item 18 or 19, wherein the processing resource further comprises a predicate index storage module, the method further comprising storing the predicate indices for the at least one state group.

21. The method of item 20, further comprising clearing the predicate index storage module upon execution of the instruction to transmit the state information.

22. The method of any of items 14 to 21, wherein the processing resource comprises communication circuitry to enable direct memory access between the shadow state storage module and the processing state storage module.

23. The method of item 22, wherein executing the instruction to transmit the state information from the shadow state storage module to the processing state storage module comprises transmitting all of the one or more changed states substantially simultaneously.

24. The method of any of items 14 to 23, wherein the processing resource further comprises a state handling module provided to the at least one processing circuit, the method further comprising, when the at least one state group is required by the processing task assigned to the at least one processing circuit, the state handling module propagating the state information stored on the processing state storage module to the processing task.

25. The method of item 24, further comprising the state handling module generating one or more state descriptor based on the state information stored on the resource-side state storage module.

26. A non-transitory computer readable storage medium comprising software code which, when executed on a processor, causes the processor to perform the method of any of items 14 to 25.

The invention claimed is:

1. A processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising:

a control circuit configured to execute commands from the command stream, wherein the command stream comprises one or more commands relating to a processing task and one or more commands relating to at least one state group associated with the processing task, the at least one state group comprising a plurality of states;

at least one processing circuit configured to perform processing tasks;

a shadow state storage module configured for use by the control circuit to store state information; and a processing state storage module configured for use by the processing circuit to store state information, wherein the control circuit is configured to determine whether the at least one state group includes one or more changed states with respect to a preceding API call, to write state information comprising the one or more changed states of the at least one state group to the shadow state storage module, and to assign the processing task to the at least one processing circuit and execute an instruction to transmit the state information from the shadow state storage module to the processing state storage module.

2. The processing resource of claim 1, wherein the control circuit is configured to clear the shadow state storage module upon execution of the instruction to transmit the state information.

3. The processing resource of claim 1, wherein the processing state storage module is configured to store thereon a previous version of the at least one state group in relation to the preceding API call, and the control circuit is configured to execute the instruction to transmit the state information from the shadow state storage module to the processing state storage module by overwriting one or more states in the previous version of the at least one state group stored on the processing state storage module corresponding to the one or more changed states with the one or more changed states.

4. The processing resource of claim 1, wherein each state of the at least one state group is provided with a state index indicating a location of the state within the at least one state group, each of the one or more changed states being identified by a corresponding state index, and the control circuit is configured to execute the instruction to transmit the state information from the shadow state storage module to the processing state storage module based on the state index or indices of the one or more changed state.

5. The processing resource of claim 1, wherein the control circuit is configured to, when determining one or more changed state for the at least one state group, generate a predicate index for each state of the at least one state group indicating whether the state has changed.

6. The processing resource of claim 5, wherein the control circuit is configured to execute the instruction to transmit the state information from the shadow state storage module to the processing state storage module using the predicate index for each state of the at least one state group to identify the one or more changed state amongst the plurality of states in the at least one state group.

7. The processing resource of claim 5, further comprising a predicate index storage module configured to store the predicate indices for the at least one state group.

8. The processing resource of claim 1, further comprising circuitry to enable direct memory access between the shadow state storage module and the processing state storage module.

9. The processing resource of claim 1, further comprising a state handling module provided to the at least one processing circuit, the state handling module being configured to, when the at least one state group is required by the processing task assigned to the at least one processing circuit, propagate the state information stored on the processing state storage module to the processing task.

10. A graphics processing system comprising:

a host processor configured to execute an application by generating a command stream in response to an application programming interface, API, call from the application; and a processing resource of claim 1.

11. A method of operating a processing resource for a graphics processing system, the processing resource configured to perform graphics processing for an application executing on a host processor of the graphics processing system by performing processing tasks according to a command stream received from the host processor, the command stream being generated by the host processor in response to an application programming interface, API, call from the application, the processing resource comprising:

a control circuit configured to execute commands from the command stream, wherein the command stream comprises one or more commands relating to a processing task and one or more commands relating to at least one state group associated with the processing task, the at least one state group comprising a plurality of states;

at least one processing circuit configured to perform processing tasks;

a shadow state storage module configured for use by the control circuit to store state information; and a processing state storage module configured for use by the processing circuit to store state information, the method comprising:

determining, whether the at least one state group includes one or more changed states with respect to a preceding API call;

writing state information comprising the one or more changed states of the at least one state group to the shadow state storage module;

assigning the processing task to the at least one processing circuit; and executing an instruction to transmit the state information from the shadow state storage module to the processing state storage module.

12. The method of claim 11, further comprising clearing the shadow state storage module upon execution of the instruction to transmit the state information.

13. The method of claim 11, wherein the processing state storage module has stored thereon a previous version of the at least one state group in relation to the preceding API call, and wherein executing the instruction to transmit the state information from the shadow state storage module to the processing state storage module comprises overwriting one or more states in the previous version of the at least one state group stored on the processing state storage module corresponding to the one or more changed states with the one or more changed states.

14. The method of claim 11, wherein each state of the at least one state group is provided with a state index indicating a location of the state within the at least one state group, each of the one or more changed states being identified by a corresponding state index, and executing the instruction to transmit the state information from the shadow state storage module to the processing state storage module is performed based on the state index or indices for the one or more changed state.

15. The method of any of claim 11, further comprising, when determining one or more changed state for the at least one state group, generating a predicate index for each state of the at least one state group indicating whether the state has changed.

16. The method of claim 15, wherein executing the instruction to transmit the state information from the shadow state storage module to the processing state storage module is performed using the predicate index for each state of the at least one state group to identify the one or more changed state amongst the plurality of states in the at least one state group.

17. The method of claim 15, wherein the processing resource further comprises a predicate index storage module, the method further comprising storing the predicate indices for the at least one state group.

18. The method of claim 11, wherein the processing resource comprises communication circuitry to enable direct memory access between the shadow state storage module and the processing state storage module.

19. The method of claim 11, wherein the processing resource further comprises a state handling module provided to the at least one processing circuit, the method further comprising, when the at least one state group is required by the processing task assigned to the at least one processing circuit, the state handling module propagating the state information stored on the processing state storage module to the processing task.

20. A non-transitory computer readable storage medium comprising software code which, when executed on a processor, causes the processor to perform the method of claim 14.

* * * * *